(12) United States Patent
Da Silva et al.

(10) Patent No.: US 10,093,435 B2
(45) Date of Patent: Oct. 9, 2018

(54) INTEGRATED SYSTEM AND METHODS FOR MANAGEMENT AND MONITORING OF VEHICLES

(71) Applicant: Embraer S.A., São José dos Campos (BR)

(72) Inventors: Paulo Anchieta Da Silva, São José dos Campos (BR); Fernando Dotta, São José dos Campos (BR); Ricardo Pinheiro Rulli, São José dos Campos (BR); Tomaz Lazanha, São José dos Campos (BR); Marcelo Rosa Suzuki, São José dos Campos (BR); Laudier Jacques De Moraes Da Costa, São José dos Campos (BR); Cassio Wallner, São José dos Campos (BR); Ricardo Rogulski, São José dos Campos (BR)

(73) Assignee: Embraer S.A., São José dos Campos (BR)

( * ) Notice: Subject to any disclaimer, the term of this patent is extended or adjusted under 35 U.S.C. 154(b) by 79 days.

(21) Appl. No.: 14/716,325

(22) Filed: May 19, 2015

(65) Prior Publication Data

US 2016/0340058 A1 Nov. 24, 2016

(51) Int. Cl.
*B64F 5/00* (2017.01)
*B60R 16/023* (2006.01)
(Continued)

(52) U.S. Cl.
CPC ........ *B64F 5/0045* (2013.01); *B60R 16/0234* (2013.01); *B64D 45/00* (2013.01);
(Continued)

(58) Field of Classification Search
CPC .................. B64F 5/0045; B64D 45/00; B64D 2045/0085; G07C 5/006; G07C 5/0808;
(Continued)

(56) References Cited

U.S. PATENT DOCUMENTS

2003/0191564 A1* 10/2003 Haugse ............. G05B 23/0283
701/29.4
2013/0055816 A1* 3/2013 Masson ................ G01N 29/069
73/598
2013/0166458 A1 6/2013 Wallner et al.

* cited by examiner

*Primary Examiner* — Jelani A Smith
*Assistant Examiner* — Kelly D Williams
(74) *Attorney, Agent, or Firm* — Nixon & Vanderhye P.C.

(57) ABSTRACT

An integrated system for assessing the condition and management of a structural platform or a plurality of platforms includes a Structural Health Monitoring System (SHM), an Operational loads Monitoring System (OLM), a static, fatigue and damage tolerance analysis (FDTA) subsystem, a databank storing a maintenance plan, and a subsystem configured for damage and repair management (iSRM). The SHM may include a plurality of transducers, including a plurality of pairs of actuators and sensors; a generator device configured to excite at least one of said sensors to produce ultrasonic guided waves; and a signal processor device configured to receive the signals reflected from damage identification. The Operational loads Monitoring System (OLM) may comprise parametric models using flight parameter data. The static, fatigue and damage tolerance analysis (FDTA) subsystem may be configured to use parametric models using Finite element Models results and abacus. The databank storing a maintenance plan may comprise information relating to inspection periods and tasks of the structural platform or a plurality of platforms.

11 Claims, 15 Drawing Sheets

Flow of the Integrated Systems to Provide Substantiation Reports of a Structural Damage Assessment

(51) Int. Cl.
     *G01M 5/00*           (2006.01)
     *B64D 45/00*         (2006.01)
     *G07C 5/08*           (2006.01)
     *G07C 5/00*           (2006.01)
     *G01M 17/007*       (2006.01)

(52) U.S. Cl.
     CPC ........ *G01M 5/0033* (2013.01); *G01M 5/0066* (2013.01); *G01M 17/007* (2013.01); *G07C 5/006* (2013.01); *G07C 5/008* (2013.01); *G07C 5/0808* (2013.01); *B64D 2045/0085* (2013.01)

(58) Field of Classification Search
     CPC .... G07C 5/00; G01M 5/0066; G01M 5/0033; B60R 16/0234
     See application file for complete search history.

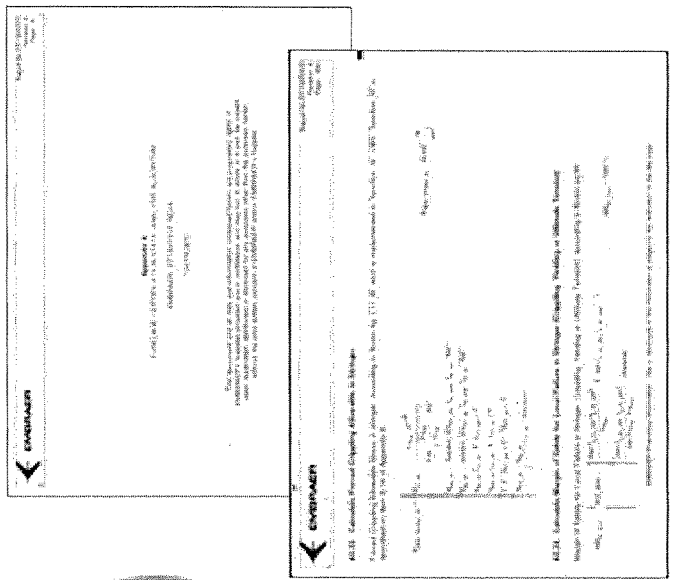
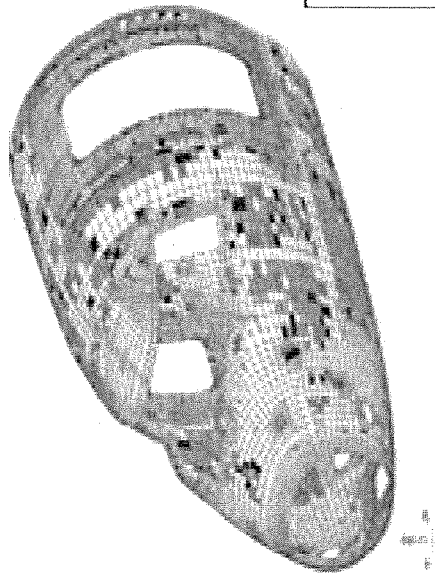
Figure 1C

Figure 1E

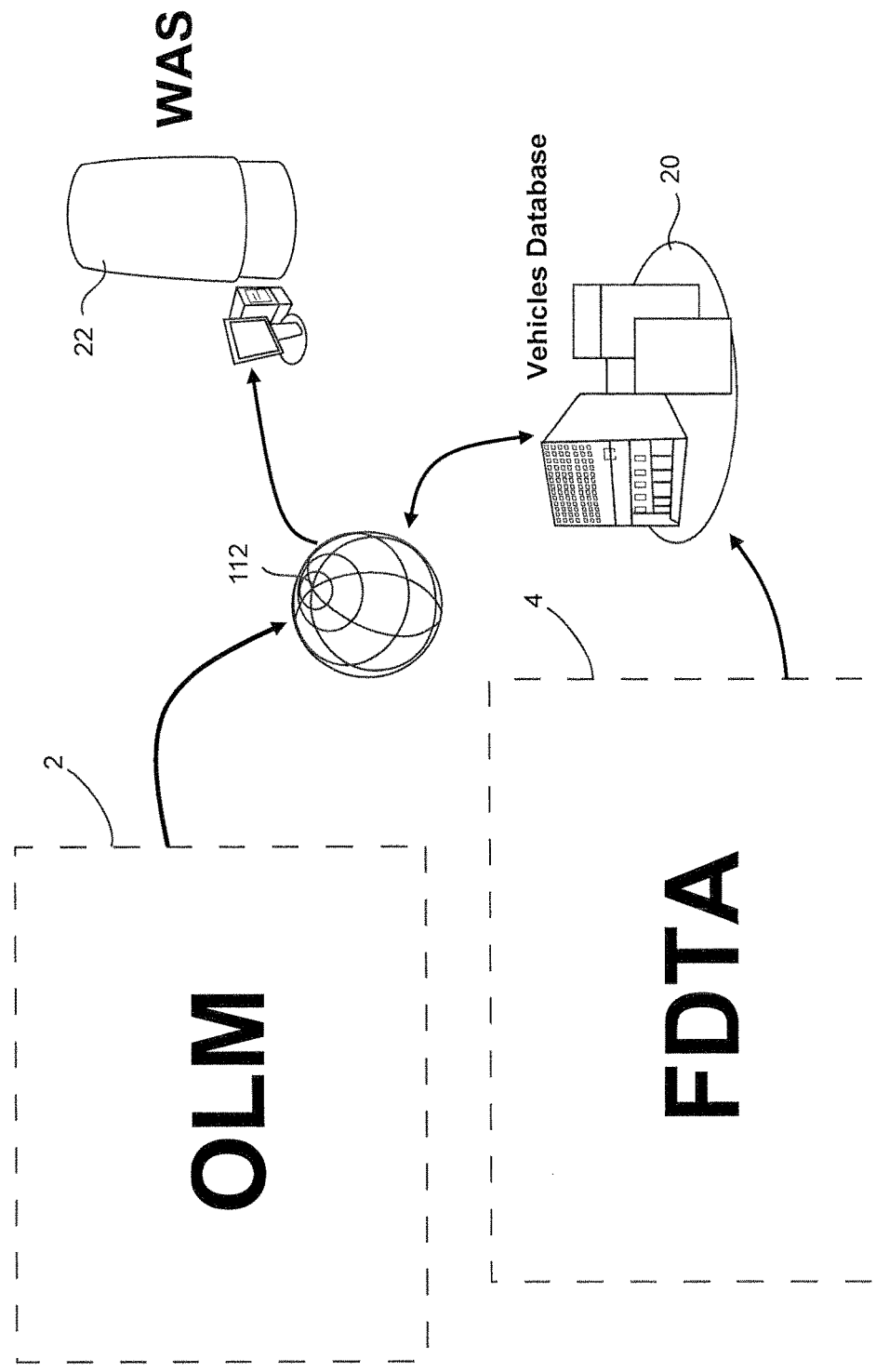
Figure 2A Flow of the Integrated Systems to Provide Warnings

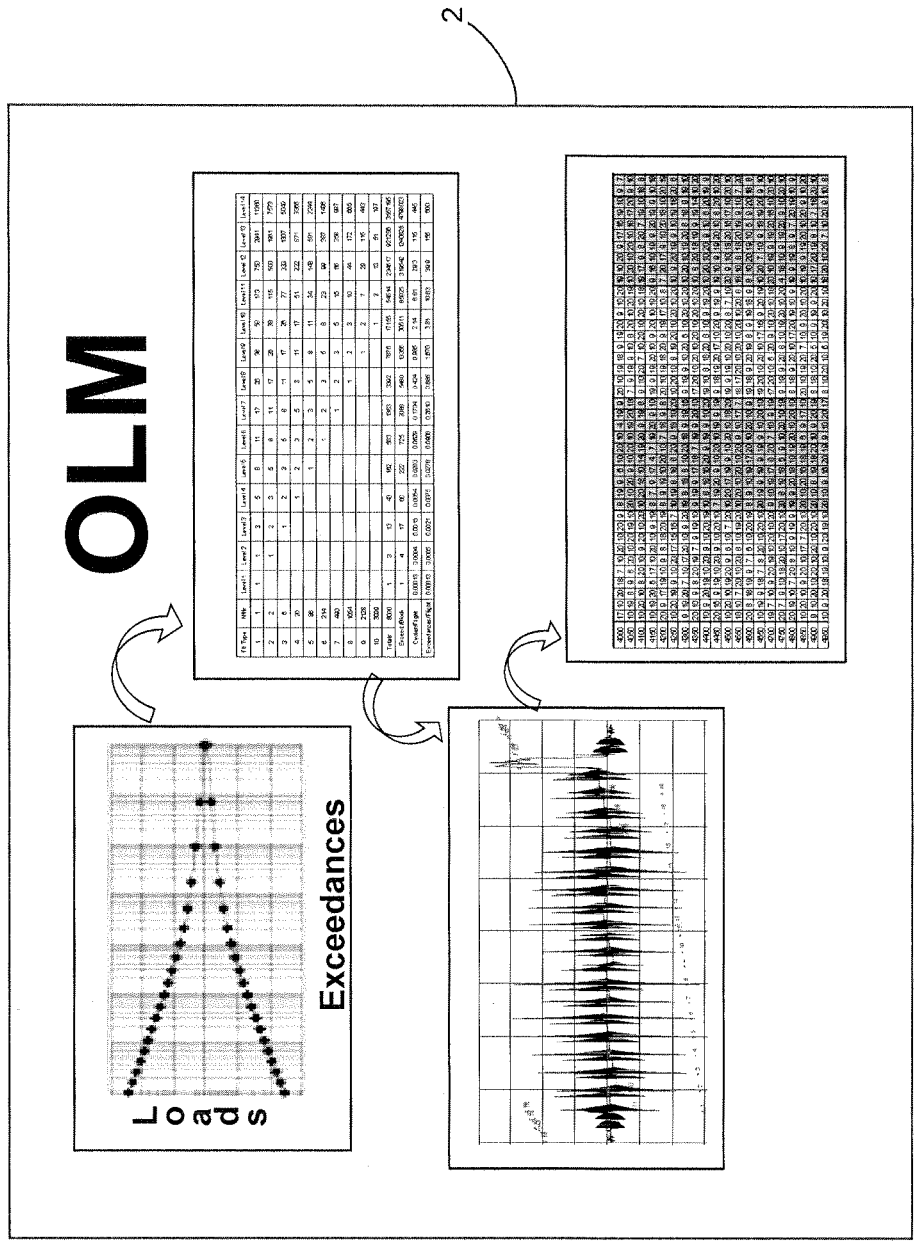
Figure 2B Flow of the Integrated Systems to Provide Warnings

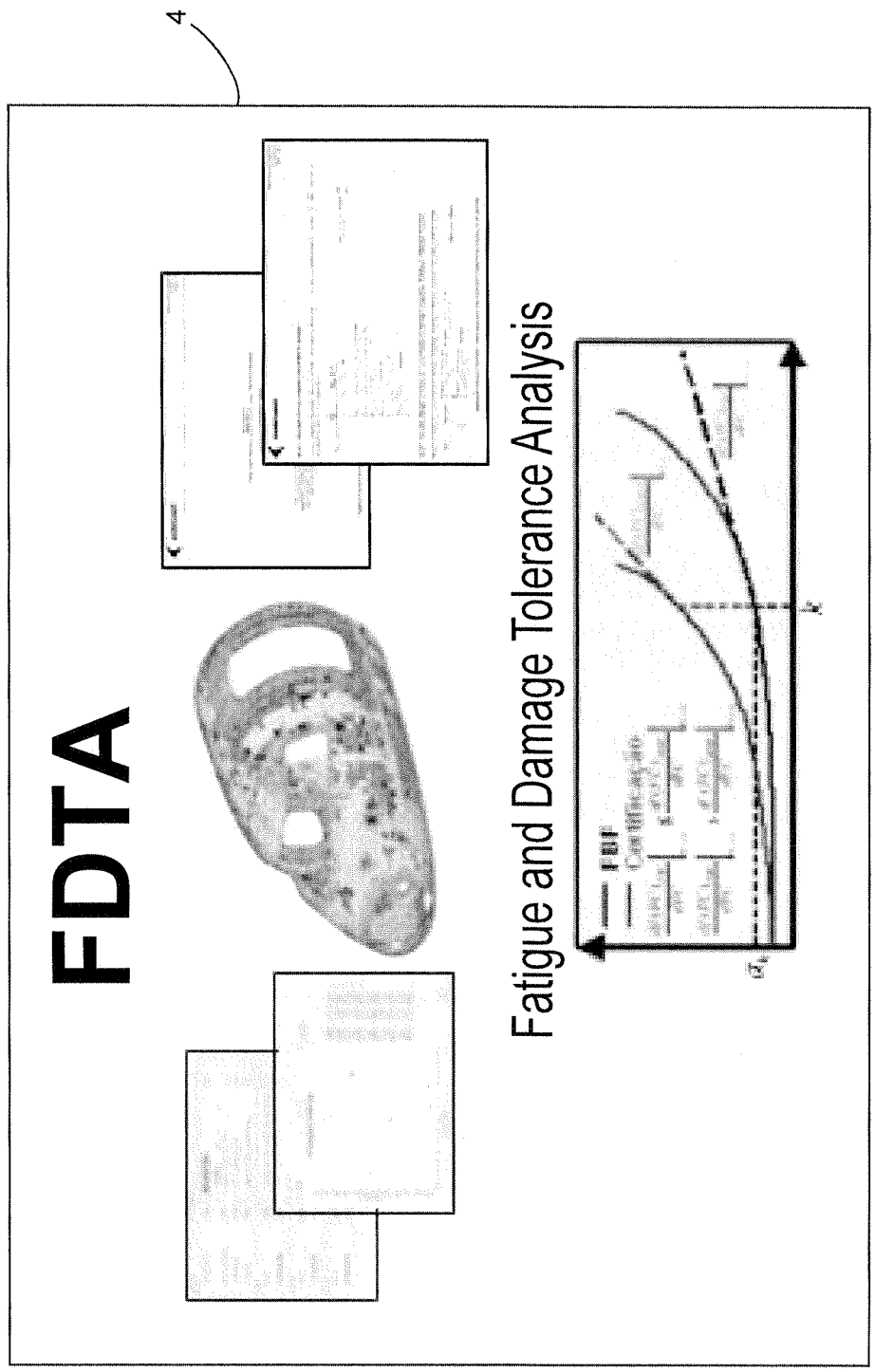
Figure 2C Flow of the Integrated Systems to Provide Warnings

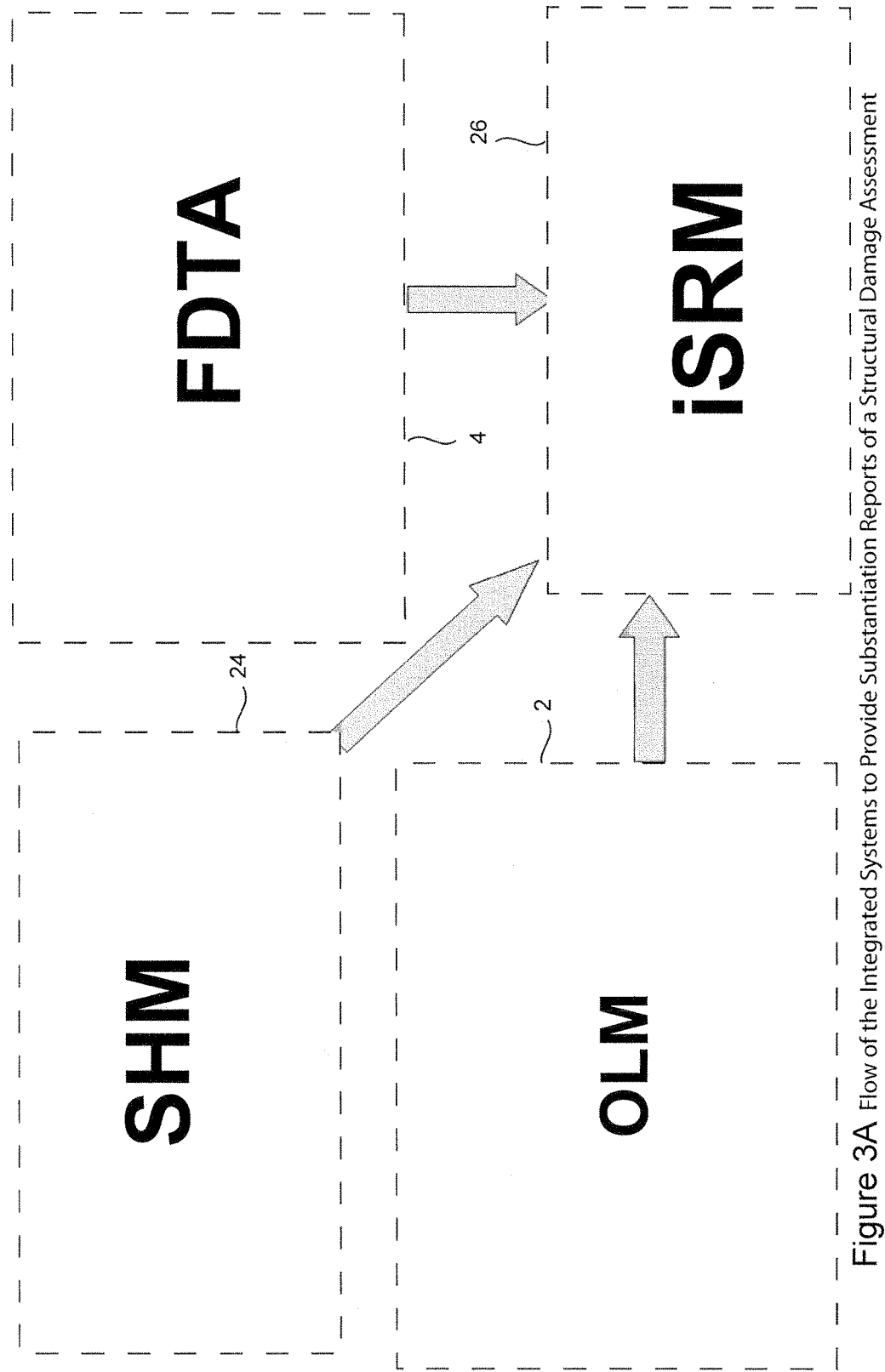
Figure 3A Flow of the Integrated Systems to Provide Substantiation Reports of a Structural Damage Assessment

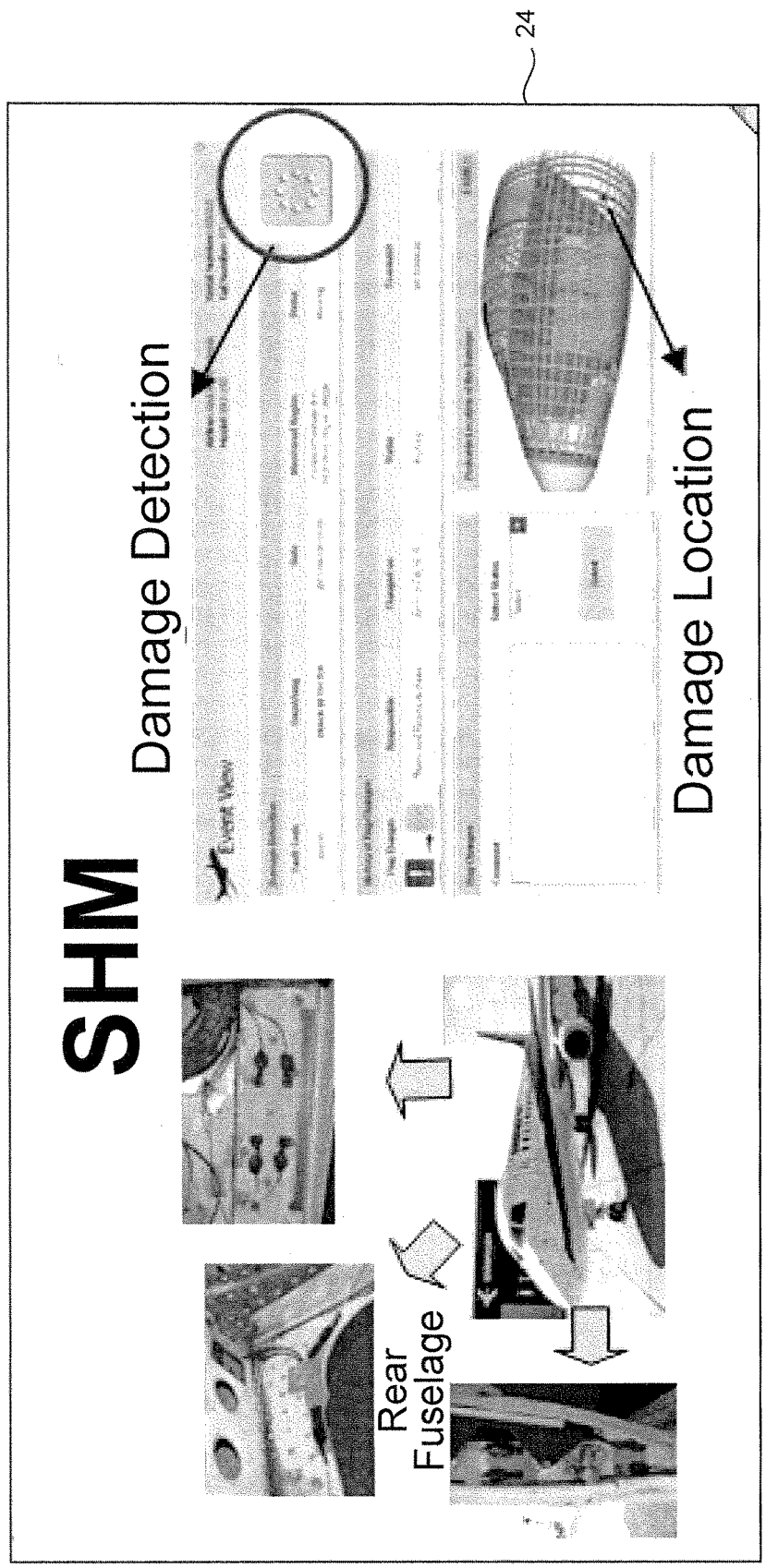
Figure 3B Flow of the Integrated Systems to Provide Substantiation Reports of a Structural Damage Assessment

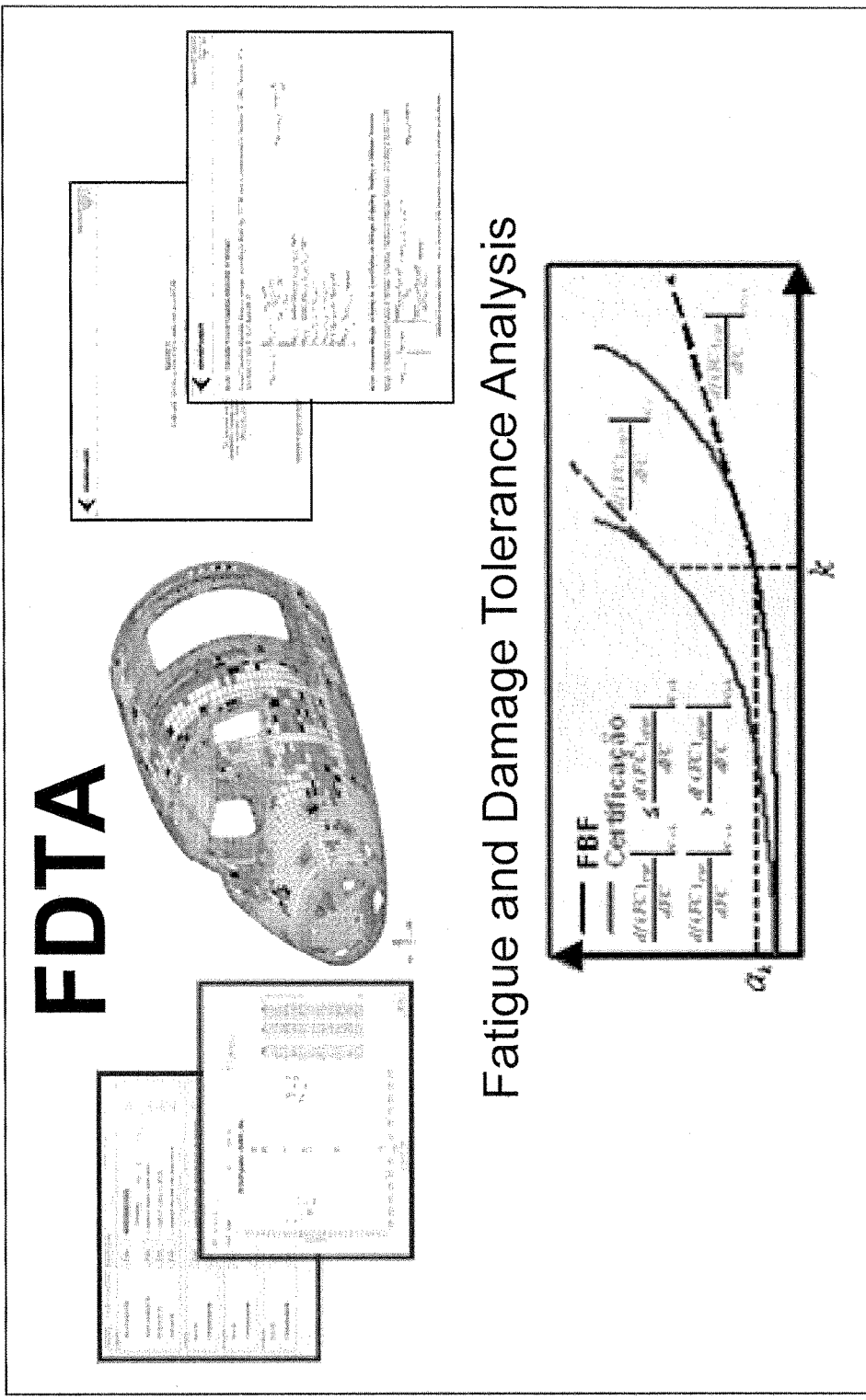
Figure 3C Flow of the Integrated Systems to Provide Substantiation Reports of a Structural Damage Assessment

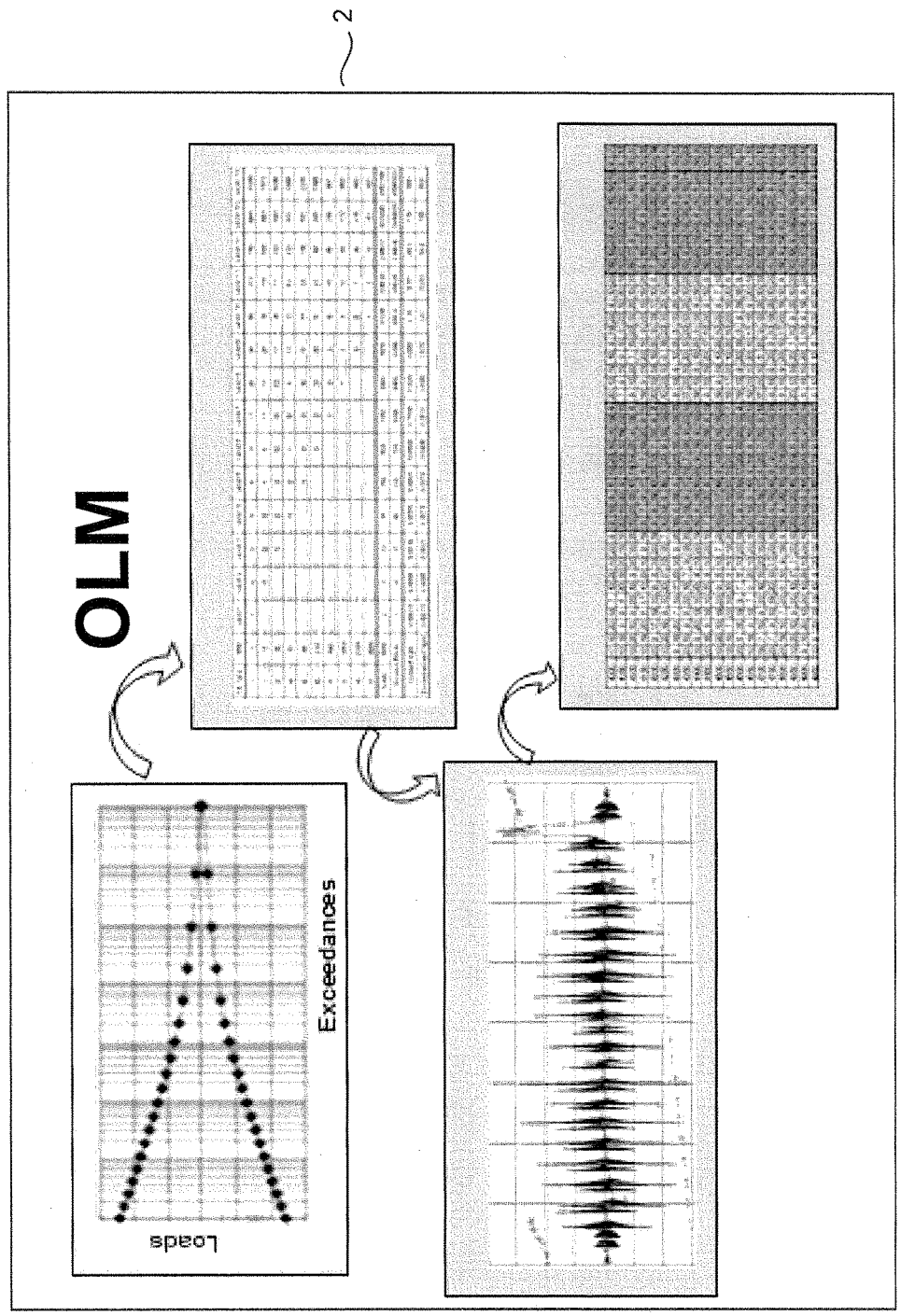
Figure 3D Flow of the Integrated Systems to Provide Substantiation Reports of a Structural Damage Assessment

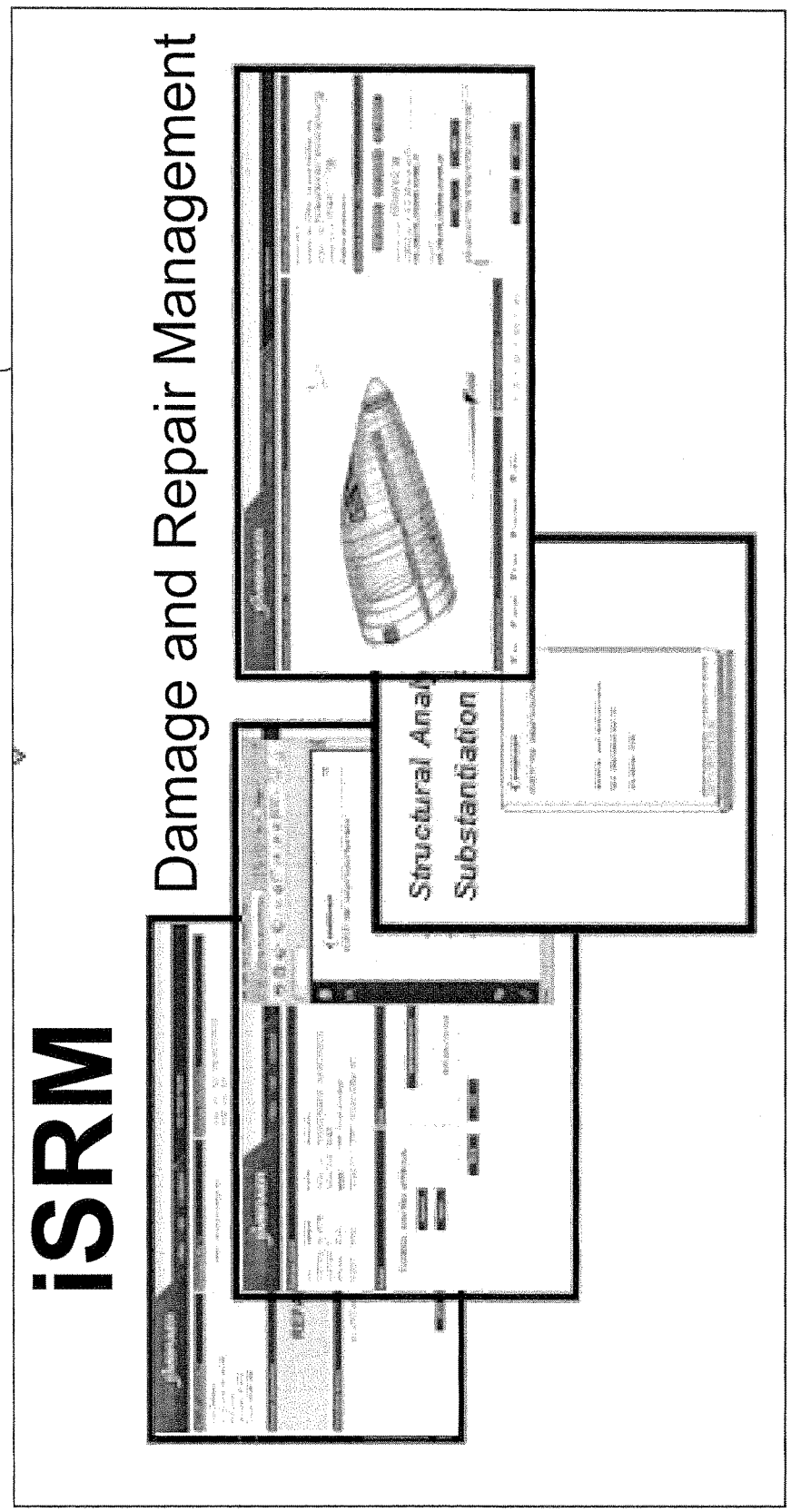
Figure 3E  Flow of the Integrated Systems to Provide Substantiation Reports of a Structural Damage Assessment

INTEGRATED SYSTEM AND METHODS FOR MANAGEMENT AND MONITORING OF VEHICLES

CROSS-REFERENCE TO RELATED APPLICATIONS

None.

STATEMENT REGARDING FEDERALLY SPONSORED RESEARCH OR DEVELOPMENT

None.

FIELD

The technologies herein relate to system and methods for automated detection of damage and structural failure, for automated estimation of the real usage of the vehicle's structural components, for remote assessment of structural damage, repair and management of applicable maintenance information, and more particularly to computer-based sensing technology, systems and methods for structural management and monitoring, and customization of maintenance programs of vehicles in service.

BACKGROUND

Seeking safety improvement and reduction of maintenance cost and human error, efforts are underway to develop automatic Structural Health Monitoring (SHM) systems capable of inspecting and detecting damage and operational loads in real time without need for human interference. New SHM technologies will lead to early detection of damages that usually in the past were identified only through scheduled inspections. Besides that, OLM (Operational Loads Monitoring) systems will provide the real operational loads, which often were previously unmonitored.

BRIEF DESCRIPTION OF THE DRAWINGS

The following detailed description of exemplary non-limiting illustrative embodiments is to be read in conjunction with the drawings of which:

FIGS. 1A-1E show an example flow of a non-limiting embodiment integrated system to customize a maintenance program;

FIGS. 2A-2C show an example flow of a non-limiting embodiment integrated system to provide automated warnings;

FIGS. 3A-3E show an example flow of a non-limiting embodiment integrated system to provide substantiation reports of a structural damage assessment;

DETAILED DESCRIPTION

Figure 4:
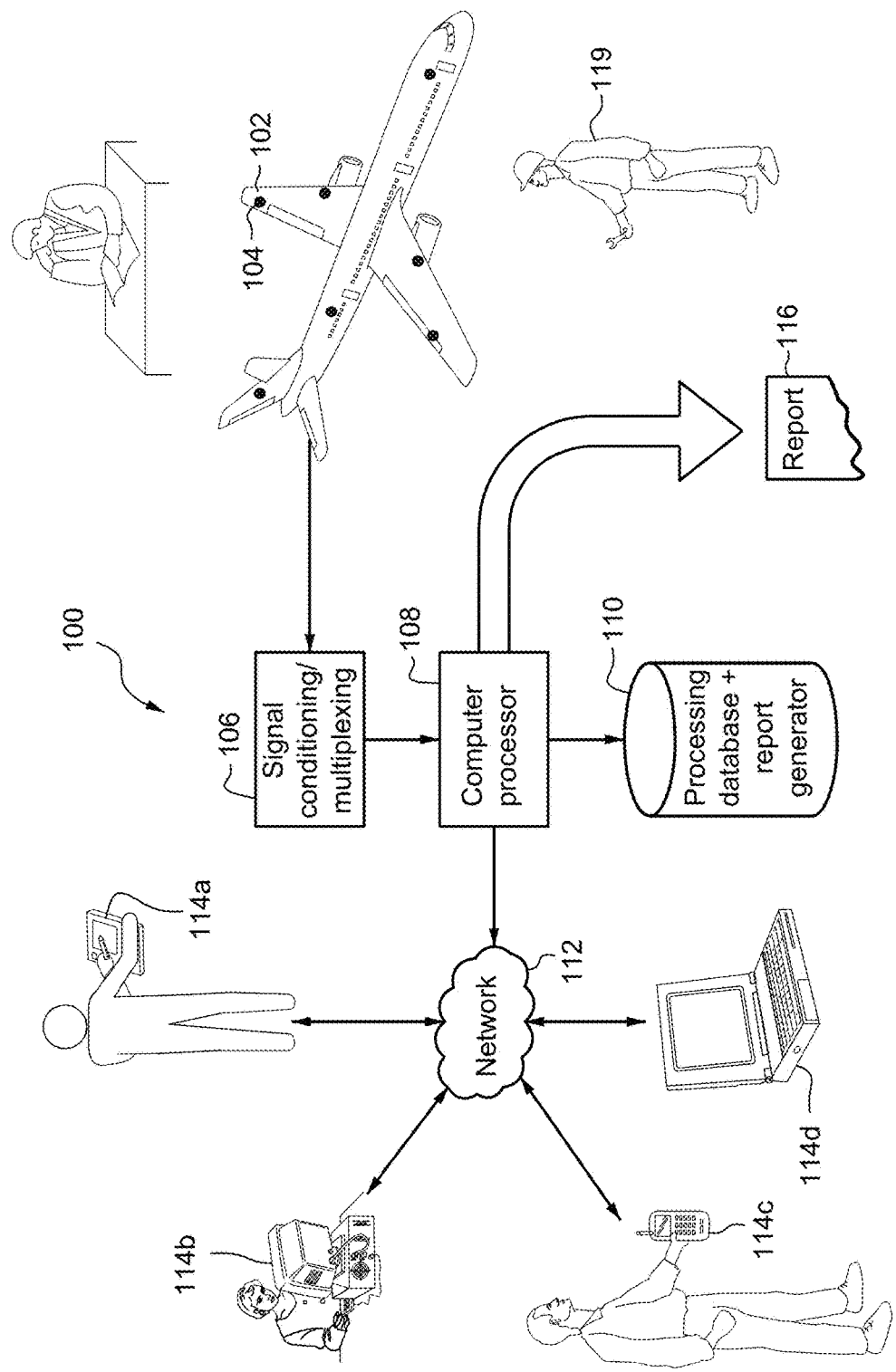
FIG. 4 shows an example non-limiting diagram of an overall integrated system.

FIG. 4 shows an example non-limiting system 100 including a subsystem configured for damage repair and management (iSRM). As shown in FIG. 4, an aircraft 102 can be equipped with or otherwise inspected by a variety of sensors 104 to automatically detect structural or other damage. The damage can also be detected other than by automatically. For instance, damage can be detected visually (walkaround inspection). In such case, damage information can be provided by the Airline Technical Team to iSRM manually, using the iSRM interface (e.g., via an input device 114). For example, in one example non-limiting implementation, sensors 104 provide signals of various forms including but not limited to electrical signals related to the structural condition to a signal conditioning/multiplexing device 106 that in turn provides sensed signals to a computer processor 108. Signal conditioning/multiplexing block 106 may also receive additional manual or other inputs via network 112, or such additional inputs can be provided directly to computer processor 108 via a user interface that may be directly connected to the computer processor or indirectly connected e.g., via network 112. For example, the user may provide information on the damage detected (by various means) and, using the 3D model, he identifies the location of the damage.

Computer processor 108 uses software (see FIG. 5) and data stored on a non-transitory storage device such as a disk drive, flash memory, etc. 110 to analyze the signals from sensors 104 as well as potentially other information inputs in order to detect whether the aircraft 102 has sustained damage. If damage has been sustained (FIG. 5 blocks 62-66), then computer processor 108 can use automatic and/or human-assisted algorithms to assess the severity of the damage e.g. based on a flight history or other database 3 stored on storage device 110.

Figure 5:
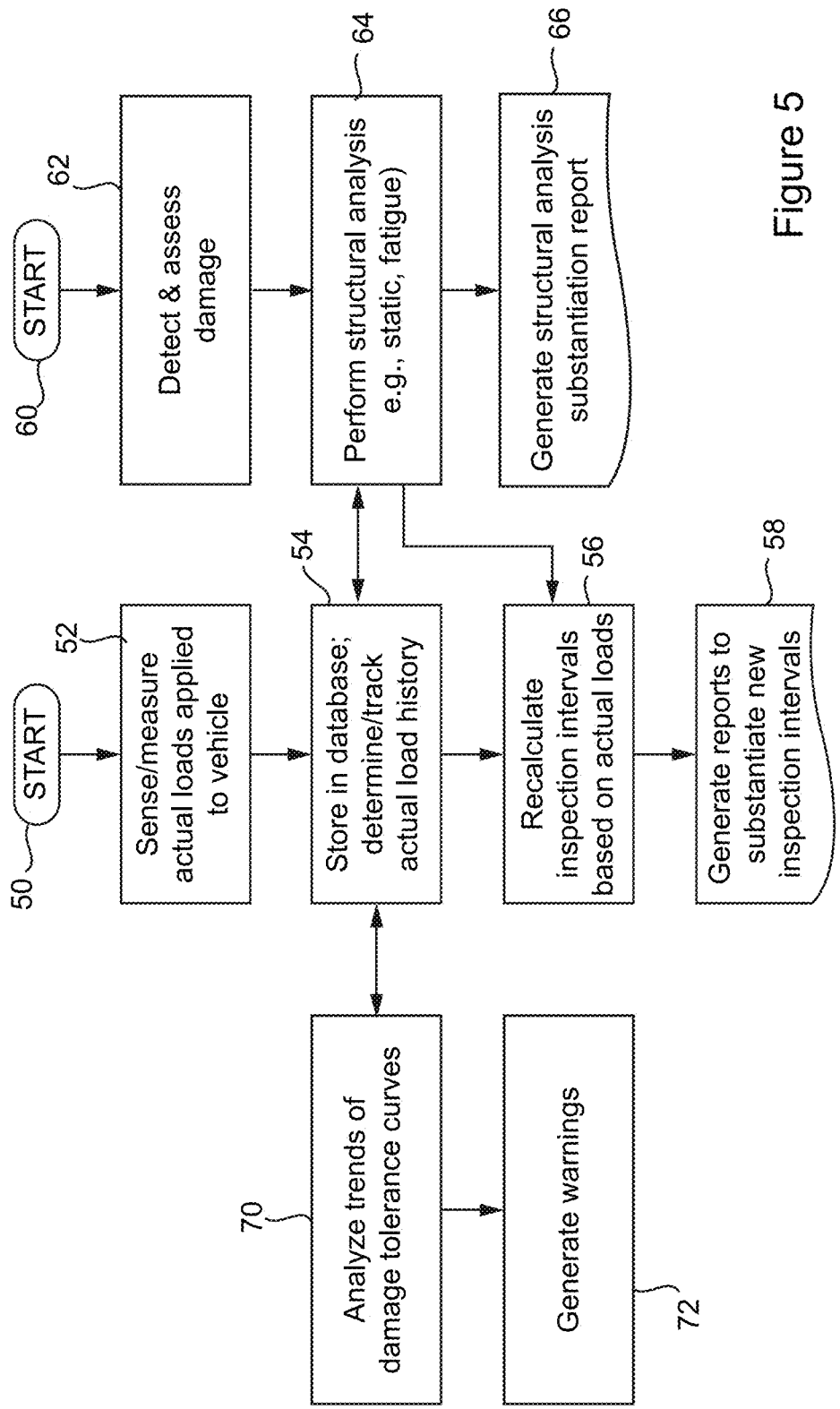
FIG. 5 shows an example non-limiting flowchart of operations performed by the FIG. 4 computer processor.

Computer processor 108 may communicate alerts, reports, or other information (FIG. 5. Blocks 58, 66, 72) via a wired and/or wireless network 112 to a variety of user interaction devices 114 included but not limited to laptop computers, smart phones, tablet computers, other personal computers or any other device that allows interactivity between humans and machines. Computer processor 108 may generate electronic, hardcopy or other reports 116 and transmit them for review by various people including service personnel 118, the manufacturer of the aircraft 102, the pilot of the aircraft, and others. It may also use software to maintain a 3D model of the particular aircraft, and render and display images on demand that enable smooth interactive navigation and display by the user between different aircraft parts and also enable identification of damaged locations of the aircraft. The example non-limiting system can further automatically enable users to manage damages, repairs and maintenance information comprising, but not limited to, providing visualization and generating reports for damages and repairs per aircraft and/or per fleet, and communicating alerts on inspection intervals for repair location.

The example non-limiting embodiment of FIG. 4 may thus provide a structural damage detection or structural health monitoring system (herein called "SHM") with methods (FIG. 5 blocks 62-66) to detect damages in structures, with those related to operational loads monitoring systems (herein called "OLM") (FIG. 5 blocks 52-58) with capabilities of evaluating real operation conditions. Vehicles in service are subject to conditions of use that can generate loads above those specified. These conditions, if not monitored, can induce the equipment to fail after some service time.

Additionally, the vehicles such as aircraft 102 are susceptible to corrosion, fatigue and accidental damage, which can be induced by service loads, environmental conditions or accidental impacts. These structural damages can be detected during scheduled maintenance (FIG. 5 block 62), based on the maintenance plan that should be followed by operators, or during the operation. However, the presently disclosed non-limiting technology can provide detection on a more frequent or continual manner.

The example non-limiting embodiment of FIG. 4 provides monitoring of structural health in an integrated manner, associating information provided by sensor networks to detect structural flaws and accidental damages (FIG. 5 blocks 52, 62). The embodiment can also provide for the monitoring of operational loads and extreme events, the management and assessment of structural damages and repairs, and the development of a customized maintenance program for each vehicle through the analysis of maintenance tasks based on the real conditions of use. This capability can be used to enable the integrated management of structural maintenance actions. The present non-limiting example embodiments can surpass the existing technologies for fleet management available in the market, providing additional information and analysis to the existing systems called Integrated Vehicle Health Management (IVHM) and Health and Usage Management Systems (HUMS).

The IVHM is a more comprehensive concept that refers to a collection of data relevant to the present and future performance of a vehicle system. The analysis of these data can be used to support operational decisions. The HUMS is related to data collection and analysis techniques to help ensure the availability, reliability and safety of vehicles. By analyzing the vehicle data, the HUMS technology, processes, methods and systems can determine the real condition of the structures, and propose maintenance actions before or later than the regularly scheduled ones (FIG. 5 blocks 58, 66).

Operational loads monitoring (OLM) (FIG. 5, blocks 50-58) is a useful part of real operational condition analysis and can provide an estimation of the real usage of the vehicle's structural components. The analysis between real and design loads enables estimation of severity usage, including the determination of extreme events, such as hard-landings, over-speeds, and others. In one example non-limiting embodiment, an Operational loads Monitoring System (OLM) comprises parametric models using flight parameter data.

Equipment to monitor the vertical and normal accelerations in a vehicle are known. By means of these accelerations measurements, it is possible to estimate the fatigue loads and provide data related to the remaining structural life (FIG. 5, block 64). Currently, several operators of vehicles still use such techniques to measure the real loads of the vehicle. On the other hand, advances in onboard recording capabilities storing hundreds of parameters with higher acquisition rates provide data for more accurate analysis.

Structural integrity monitoring can be done by indirect methods, such as OLM or using direct methods such as damage detection systems. Past efforts have been made to investigate damage detection systems applied to structural components of vehicles. Several studies of Structural Health Monitoring (SHM) application provide analysis showing a significant reduction in the life-cycle costs.

Several dynamic based diagnostic methods have been proposed or are currently being developed for structural health monitoring. Such approaches include for example vibration based methods and wave propagation methods. Other technologies under development include fiber optics and mechanical sensors. Other SHM sensing technologies include Comparative Vacuum Monitoring, Lamb Waves, Fiber Bragg Gratings, Acoustic Emission, Electro Mechanical Impedance, and others. A Structural Health Monitoring System (SHM) in the example non-limiting embodiment may thus comprise a plurality of transducers, including a plurality of pairs of actuators and sensors; a generator device configured to excite at least one of said sensors to produce ultrasonic guided waves; and a signal processor device configured to receive the signals reflected from damage identification.

Example non-limiting SHM systems can be applied in various ways including for example (1) detection in discrete periods of time; and (2) monitoring in a continuous structural verification.

Besides OLM and SHM methods, example non-limiting technology herein provides for the integration of the Static, Fatigue and Damage Tolerance Analyses systems (FDTA) (FIG. 5, blocks 60-66). Such integration can be used for example to determine new appropriate inspection intervals for each damage tolerant structure based on crack propagation analysis. During example damage tolerance analysis, a specific crack propagation analysis can be performed for each structure taking into account various parameters such as crack type, structure geometry, material parameters, real load spectra, and other factors. The analysis results can be used for example to determinate the new appropriate inspection intervals. Maintenance programs can be adjusted based on actual usage of the vehicle (arrow from block 64 to block 56 of FIG. 5).

Another example non-limiting feature relates to structural damage and repair management (iSRM). Such feature can for example be provided by a web application system capable of storing and managing the damage and repair information as described in the US20130166458, incorporated herein by reference. This system performs structural analyses including, when applicable, static analysis, fatigue analysis and damage tolerance analysis (FDTA).

Maintainability is a characteristic of design, material and installation that allows the achievement of minimum maintenance expenditures for customers. A feature of maintainability is to reduce downtime (improving availability of the vehicle), minimize delays (improving dispatchability), reduce maintenance manpower and costs and guarantee maintenance with safety.

An example Maintenance Program is the mean that an operator of vehicles uses to guarantee the maintainability. It typically contains the minimum requirements for scheduled maintenance to ensure the safe continuous utilization of vehicles. It is used to comply with personnel safety aspects, standardization of maintenance rules, accessibility aspects and interchangeability of parts.

The example Maintenance Program also includes tasks to guarantee the safety for unscheduled maintenance damages such as accidental, environmental, corrosion, battle damages, etc., and provides inspection intervals that the operator of the vehicle must comply with.

The example non-limiting embodiment herein accomplishes fleet monitoring, management and maintenance program optimization by reducing:
  troubleshooting time,
  time to perform maintenance actions,
  need and complexity of maintenance interventions,
  maintenance resources necessary to accomplish tasks,
  time to interpret information and documentation, and
  possible reduction of maintenance errors.

The example non-limiting technology herein for example can be used to reduce maintenance errors related to static, fatigue and damage tolerance analyses systems (herein called "FDTA"). The example non-limiting technology herein is able for example to determine new appropriate inspection intervals for customized maintenance programs and with those related to structural damages and repairs management systems (herein called "iSRM") that provide substantiation reports of a structural damage and repairs assessment.

One example non-limiting implementation comprises an integrated system and method for assessing the condition, use and integrity of a structural platform or a plurality of platforms performing a structural health management. This integrated system comprises in one example non-limiting embodiment:

a) Damage detection systems (herein called "SHM") with methods to detect damages in structures (FIG. 5 blocks 60-62);

b) Operational loads monitoring systems (herein called "OLM") with capabilities to evaluate the real operation conditions (FIG. 5 blocks 50-58);

c) Static, fatigue and damage tolerance analyses systems (herein called "FDTA") that are able to determine new appropriate inspection intervals for customized maintenance program (FIG. 5 block 64);

d) Structural damages and repairs management systems (herein called "iSRM") that provide substantiation reports of a structural damage and repairs assessment (FIG. 5 block 66);

e) Warning Analyzer System (herein called "WAS") with methods to generate warnings for severe flights and/or severe operations (FIG. 5 blocks 70-72).

In example non-limiting implementations, such systems are independent, but integrated, exchanging information. Example complex integration between these systems generate innovative products enabling better structural health management of a vehicle.

Other non-limiting features and advantages of the FIG. 4 system include:

Exclusively one box control wherein box control is separated for SHM, OLM, iSRM and FDTA.

The system is configured to re-evaluate inspection periods based on operational loads The system is configured to determine alerts for severe flight missions.

The system is configured to: manage damage, repairs and maintenance information, provide visualization and generating reports for damages and repairs per platform and/or plurality of platforms, and communicate alerts on inspection intervals for repair location, based on evaluating structural condition using SHM systems and in operational loads using OLM systems using stress analysis (FDTA).

The system assesses the condition and management of a structural platform or a plurality of platforms including using an integrated system and comprising:

The system detects damage to a structure; determining operational loads and extreme events; performing static, fatigue and damage tolerance analysis; and evaluating the platform maintenance plan.

The system performs customization of a maintenance plan and re-evaluating inspection periods based on operational loads.

The system performs analysis to generate warnings for severe flight missions and severe operation.

The system performs a structural management of damages and repairs based on the evaluation of the structural condition using SHM systems and in operational loads generated by OLM systems using stress analysis (FDTA).

The system is implemented at least in part by at least one computer including a processor, a display and a storage.

Integrated Systems to Customize Maintenance Program (See FIGS. 1A-1E)

Figure 1A:
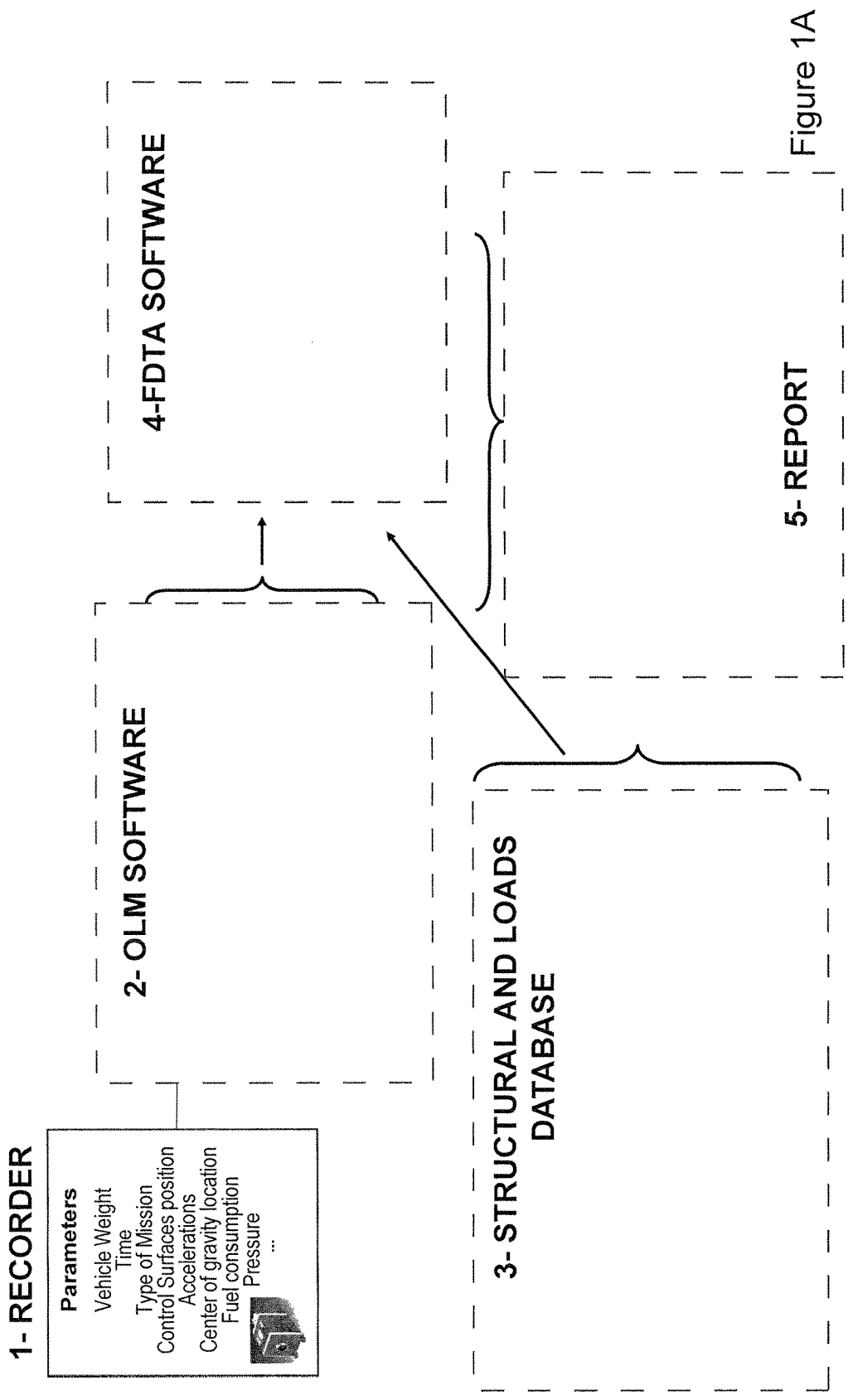
Figure 1B:
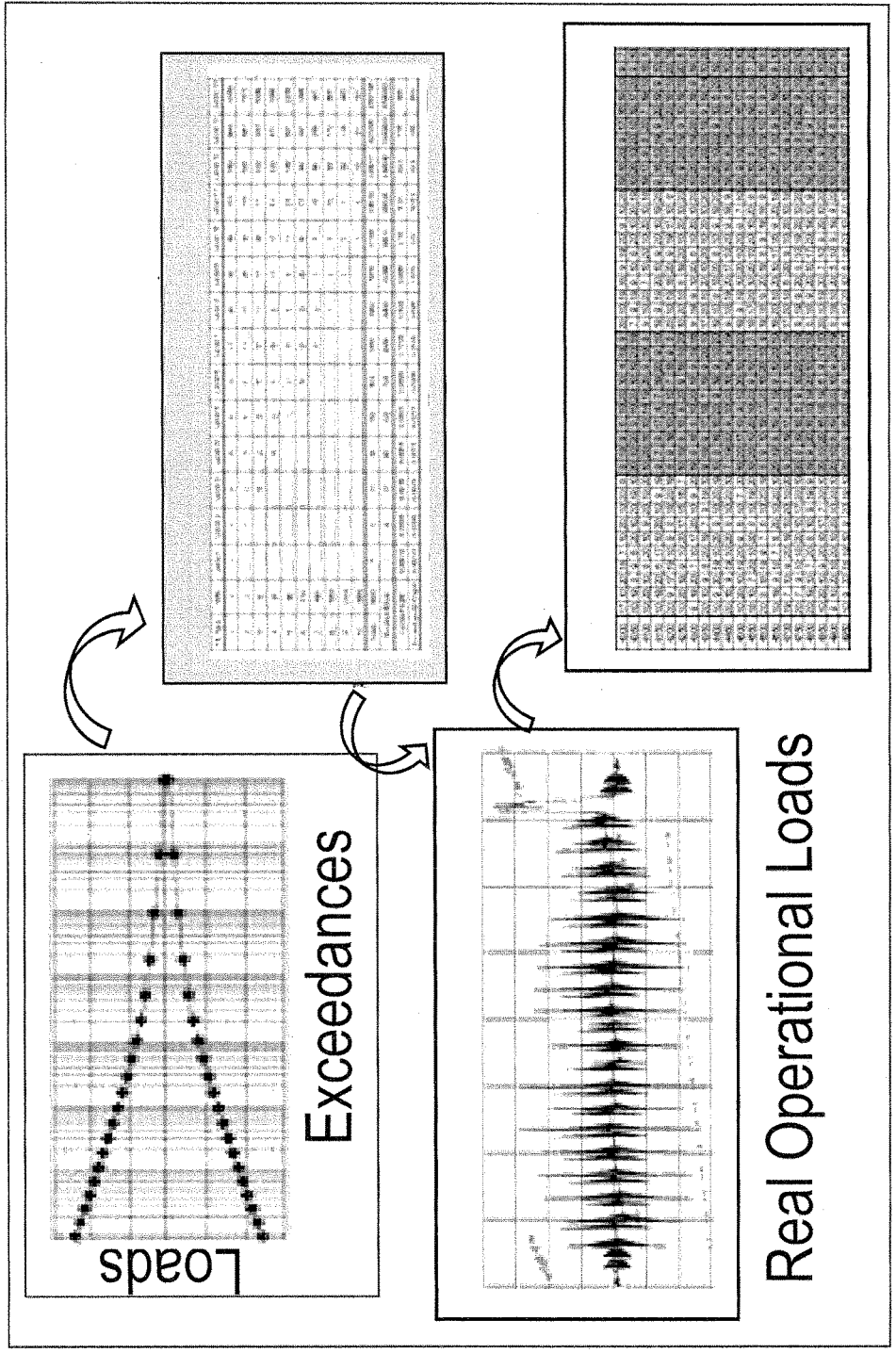
Figure 1D:
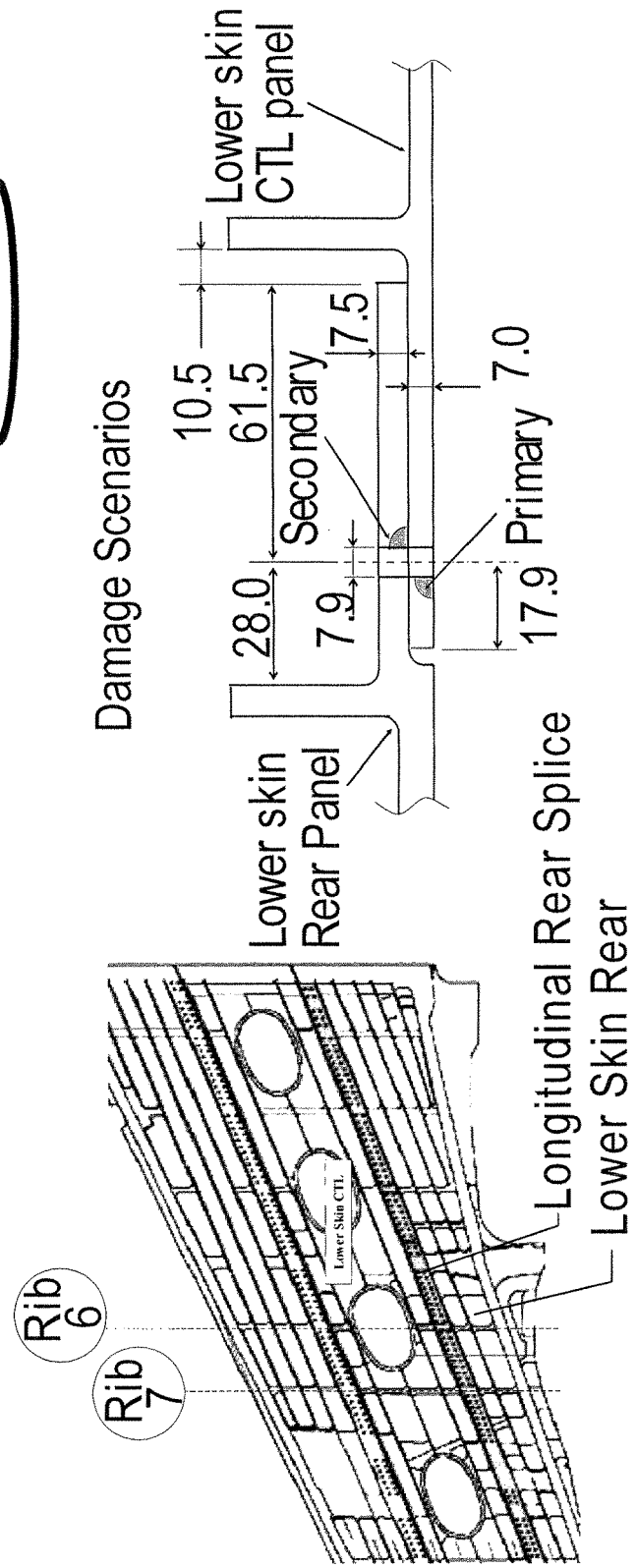
Figure 1E:
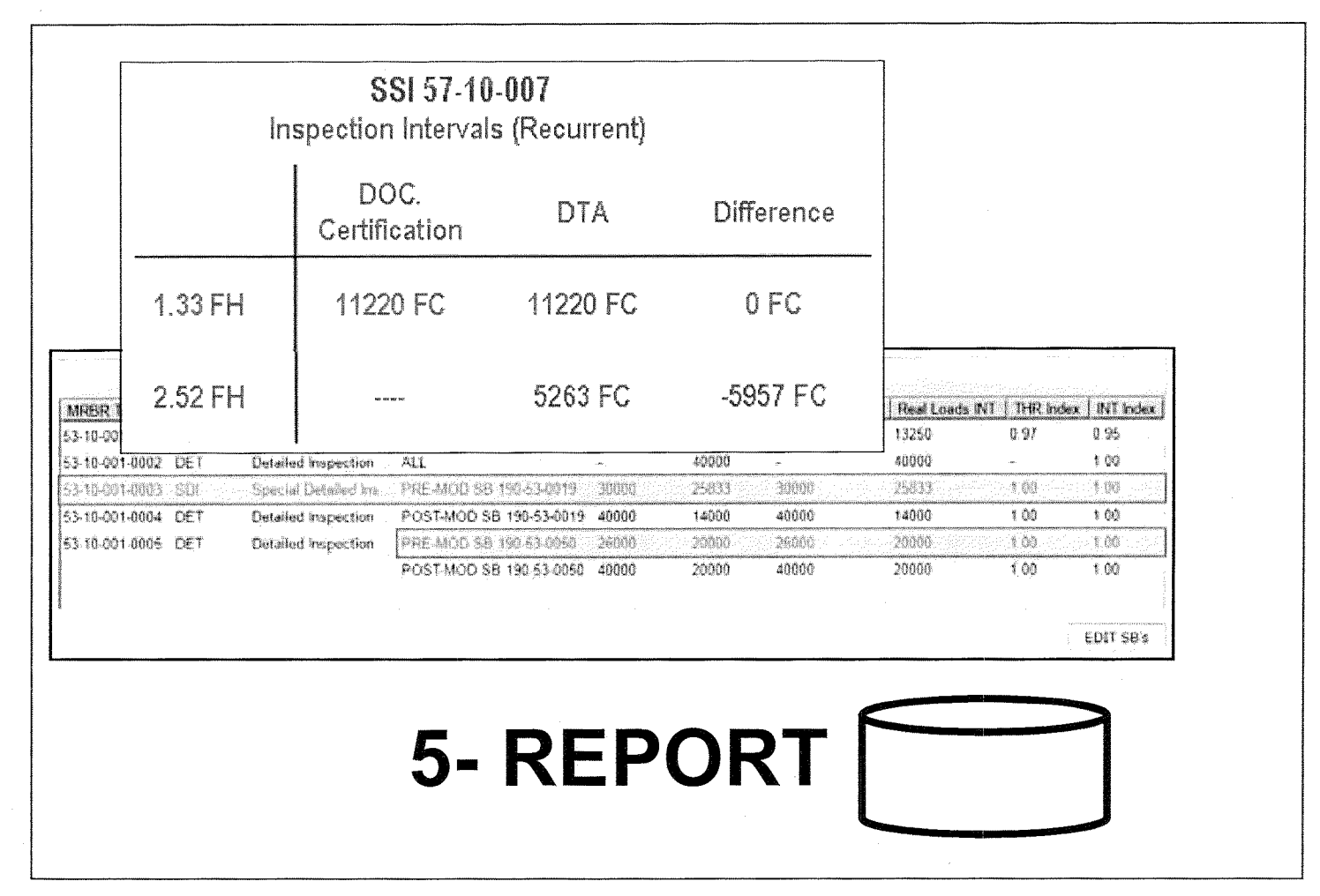

One example non-limiting embodiment compares results of maintenance intervals calculated from the loads and the damage scenarios available in the database (3 of FIG. 1D) that are used to design the vehicle to the actual loads that are applied on the vehicle during its service life and measured through sensor signals (Operational Loads Monitoring) (2 of FIG. 1B). Such sensors measure parameters like accelerations, center of gravity position, control surfaces positions, fuel consumption, etc. (FIG. 5 block 52) An algorithm developed to certify the structure is applied to the results of the measurements. This algorithm can translate the sensor signals into loads applied on the structures in special design points and then calculate the real loads the vehicle is subjected to.

In this example non-limiting embodiment, the operator of the vehicle 102 is able to determine if the vehicle is operating in a more severe pattern than the design loads (possibly reducing the maintenance interval) or less severe pattern (possibly extending the maintenance interval). (FIG. 5, block 54)

Many vehicle manufacturers follow damage tolerant designs, so it is mandatory for them to develop a maintenance plan related to actions required to maintain or improve the maintainability and reliability provided in the vehicle's design to its structures, systems, subsystems, and components throughout the vehicle's operational life.

The definition of the maintenance intervals of inspections depends on several factors including: geometry, material, stress concentrators, load history, and other factors.

The determination of the load history depends on the experience of the manufacturer (results of tests on coupons, results of tests on real environments). Using calculation methodologies, the manufacturer is able to estimate the loads that shall be used to design the vehicle. (FIG. 5, block 54)

Fatigue loads reflect expected usage of the aircraft, which are often judiciously pondered. Usually this is reduced to a mix of somewhat arbitrary short, medium and long range missions. Each of these involves operational conditions which directly influence both the fatigue performance and crack growth rate of the structure. Later on, the design usage assumption is preferably confirmed by monitoring the vehicle fleet in operation.

Operational Loads Monitoring (OLM) system (2 of FIG. 1B) is able to determine real loads the vehicle is subjected to during the operation. It can be used as an input for FDTA system (4 of FIG. 1C; FIG. 5 block 56) which is able to recalculate the inspection intervals with the actual usage of the vehicle. In the non-limiting example embodiment, a static, fatigue and damage tolerance analysis (FDTA) subsystem is configured to use parametric models using Finite element Models results and abacus. Damage scenarios are maintained, except that design loads are replaced by real loads. Such loads are derived from the parameters that are measured in a data recorder in the example embodiment by sensors such accelerometers, positioning or other sensors (1 of FIG. 1A). If the loads are higher than the design loads, the inspection intervals will be smaller and subsequent the maintenance plan is not covered. On the other hand, if the real loads are smaller than the design loads, the inspection intervals will generally be higher than the intervals presented on the maintenance plan. This enables the operator of the vehicle to postpone the inspection or in the future extend the life of the component. At the end of the process, the operator of the vehicle is able to generate reports (FIG. 5 block 58) to substantiate the new intervals of inspection and all the data is stored in a database that can be tracked for the entire life of the vehicle (3 of FIG. 1D; FIG. 5 block 54). In the non-limiting example shown, the database may comprise a databank storing a maintenance plan comprising inspection periods and tasks of the structural platform or a plurality of platforms.

Integrated Systems to Generate Warnings for Severe Flight Missions and Severe Operation (See FIGS. 2A-2C)

Example non-limiting embodiments are directed to usage of the actual loads that are applied on the vehicle during its service life and measured through the Operational Loads Monitoring system (OLM) 2 in order to generate warnings for severe flights and/or severe operations (FIG. 5 blocks 70, 72). A severe flight or a severe operation occurs when an event overcomes the project specification, such as a hard landing, flap over speed, or the like of an aircraft.

Once actual loads are generated by the OLM system 2, the example non-limiting embodiment sends the information to a database 20 for storage (FIG. 5 block 54). In sequence, a process is started and the FDTA system 4 analyzes the new data provided by the OLM system 2 (FIG. 5 block 70). The FDTA system 4 is in some example embodiments started automatically. In other example embodiments, the FDTA system 4 is started by user request. Results the FDTA system 4 generates are stored in the database 20. The Warning Analyzer System (WAS) 22 automatically determines warnings based on the results of the stored by the FDTA system 4 (FIG. 5 block 72). The user can access the warning through a remote connection with the database(s) server(s).

The Warning Analyzer System 22 will determine if there is a severe flight and/or severe operation based on the trend analysis of the damage tolerance curves using the results of the FDTA database 20. In one example non-limiting embodiment, the warning is generated only when the two following conditions are true:

1) The trend of FDTA System 4 results using actual loads (OLM) overcomes the project specification; and 2) The rate of the last data points results of the FDTA System 4 using actual loads (OLM) are greater than the rate of project specification;

The Warning Analyzer System (WAS) 22 will evaluate the conditions described above and verify it against the project specification limits for each aircraft section (wings, fuselage and empennage), whereas, each section has its own limits, operations envelops and project limits. Each sub-division of the aircraft section is analyzed by the WAS 22 in order to evaluate the trends for all monitored aircraft components (FIG. 5 block 70).

Often, severe usage of a vehicle (server flight, severe operations, etc.) is reported by the conductor (pilot, driver, etc.). These reports are often subject to the sensitivity, experience and subjectivity of the conductor, leading to a subjective analysis that is not correct in all cases. The example non-limiting Warning Analyzer System (WAS) 22 determines an occurrence of a severe event, and consequently a warning, based on analytical analysis, minimizing the human factors and increasing the safety of the vehicle.

Integrated Systems to Provide Substantiation Reports of a Structural Damage Assessment (See FIGS. 3A-3E)

A further example non-limiting embodiment evaluates the effect of damages and repairs on the structural integrity in order to ensure safe operation of the vehicle.

According to such damage severity, the vehicle may be returned to service without repair. This kind of allowable damage should have no significant effect on the strength or fatigue life of the structure, which must still be capable of fulfilling its design function. Depending on its severity, some damage may be allowed only for a specific period, herein called "allowable damage period", in which the vehicle can operate with damage prior to the repair installation. For more severe damage, the vehicle shall promptly be removed from operation for repair.

FIGS. 3A-3E presents an example non-limiting flowchart of integrated systems to provide substantiation reports of a structural damage assessment.

Once the damage is detected during the vehicle operation by means of the conventional inspection methods or through SHM systems 24, the maintenance technical team can perform a prompt damage assessment, determining the damage severity and the applicable maintenance actions (FIG. 5 block 62).

Using the iSRM system graphic 24 interface via Web, Local Network and/or Local Computer 112, 114, a maintenance technical team can for example characterize the damage detected in the structure supplying damage information such as dimensions, damage type, location, affected areas, and the like.

The example non-limiting iSRM system 26 assesses the damage based on damage information supplied by the user and the structural properties from the selected part in the 3D model, and suggests an appropriate damage disposition. This automated analysis results in an allowable damage, temporary allowable damage, temporary repair, permanent repair or contact manufacturer for specific disposition.

Based on engineering criteria and structural analysis, the example non-limiting iSRM system 26 performs a specific assessment for the detected damage considering several parameters such as damage type, geometry and dimensions of affected areas, material parameters, real operational loads, and the like (FIG. 5 block 62).

In order to comply with the applicable regulatory agency requirements and to substantiate the structural damage and repair, the example non-limiting embodiment performs several structural analyses including, when applicable, static analysis, fatigue analysis and damage tolerance analysis (FDTA system 4; FIG. 5 block 64).

When applicable, based on several failure criteria (tensile, compression, buckling and post-buckling, crippling, durability, or the like), the example non-limiting embodiment performs a specific static analysis or/and fatigue analysis in order to evaluate the behavior of the damaged or repaired structure under static and cyclic loading (load spectrum).

Besides the repair or rework procedure, the example non-limiting embodiment system provides, when applicable, the allowable damage period and the new inspection intervals for damage and repair location (arrow from block 64 to block 56). In order to determine these periods and intervals, during the damage tolerance analysis, a specific crack propagation analysis or damage growth analysis will be performed automatically by the system.

As shown in FIG. 3D, the example non-limiting embodiment uses real load spectra from the OLM (Operational Loads Monitoring) system 2 during the static analysis, fatigue analysis and damage tolerance analysis in order to achieve a more realistic analysis based on the actual usage of the vehicle (FIG. 5 arrow from block 54 to block 64). The damage and repair assessment with the real load conditions provides more appropriate damage dispositions and customized allowable damage periods and/or inspection intervals.

After completing the automated structural analysis, the example non-limiting embodiment iSRM system 26 generates a structural analysis substantiation report containing information of the accomplished analyses and submits it for human review, evaluation and approval (FIG. 5 block 66). Once the report is approved by the responsible person, the damage disposition can promptly be made available to the maintenance technical team for vehicle repair.

In the example non-limiting embodiments, integrated systems will be responsible for storage and management of the vehicle damage and repair information.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. An integrated system for assessing the condition and management of a structural platform in flight, the system comprising:
    a Structural Health Monitoring System (SHM) comprising:
        a plurality of transducers, including a plurality of pairs of actuators and sensors,
        a generator device configured to excite at least one of said actuators to produce ultrasonic guided waves, and
        at least one of the sensors configured to receive ultrasonic guided wave signals reflected from damage in the structural platform;
    an Operational loads Monitoring System (OLM) coupled to at least some of the sensors, the Operational loads Monitoring System comprising at least one processor that, while the structural platform is in flight, applies parametric models using flight parameter data to estimate real usage of structural components by performing a static, fatigue and damage tolerance analysis (FDTA) using the parametric models and Finite element Models results;
    a databank storing a maintenance plan comprising inspection periods and tasks of the structural platform or a plurality of structural platforms; and
    a subsystem coupled to the Operational loads Monitoring System, the subsystem being configured for damage and repair management (iSRM) to generate warnings to the pilot during flight for enabling inflight response to detected damage.

2. The integrated system of claim 1 wherein the system is exclusively one unit control.

3. The integrated system of claim 2 wherein control is separated for SHM, OLM, iSRM and FDTA.

4. The integrated system of claim 1 wherein the system is configured to re-evaluate inspection periods based on operational loads.

5. The integrated system of claim 1 wherein the system is configured to determine alerts to be generated in flight during severe flight missions that operate the structural platform in a more severe condition than design loads.

6. The integrated system of claim 1 wherein the system is configured to:
    manage damage, repairs and maintenance information,
    provide visualization and generate reports for damages and repairs per platform, and
    communicate alerts on inspection intervals for repair location, based on evaluating structural condition using SHM and in operational loads using OLM using stress analysis.

7. A method for assessing the condition and management of a structural platform in flight including using an integrated system, comprising:
    using at least one transducer, sensing in-flight operational conditions of the structural platform;
    using at least one processor coupled to the transducer, detecting in-flight damage to the structural platform;
    using the at least one processor while in-flight, determining operational loads and extreme events to use parametric models using flight parameter data to perform analysis between real and design loads and estimated severity usage;
    using the at least one processor executing finite element modeling, performing static, fatigue and damage tolerance analysis to determine damage sustained by the structural platform based on the estimated severity usage in flight and generating in-flight warnings to the pilot enabling real time inflight response to damage incurred in flight; and
    evaluating a platform maintenance plan in response to the determined damage.

8. The method of claim 7 further including performing customization of a maintenance plan and re-evaluating inspection periods based on operational loads.

9. The method of claim 7 further including performing analysis to generate in-flight warnings to the pilot for more severe flight and operation than design loads.

10. The method of claim 7 further including performing a structural management of damages and repairs based on the evaluation of the structural condition using structural health monitoring and in operational loads generated by operational loads monitoring using stress analysis.

11. The method of claim 7 wherein the method is implemented at least in part by at least one computer including the at least one processor, a display and a storage.

* * * * *